United States Patent
Xiu et al.

(10) Patent No.: US 9,128,536 B2
(45) Date of Patent: Sep. 8, 2015

(54) FREQUENCY SYNTHESIZER AND FREQUENCY SYNTHESIZING METHOD FOR CONVERTING FREQUENCY'S SPURIOUS TONES INTO NOISE

(75) Inventors: Liming Xiu, Plano, TX (US); Ming-Chieh Lin, Hsinchu County (TW)

(73) Assignee: NOVATEK MICROELECTRONICS CORP., Hsinchu (TW)

(*) Notice: Subject to any disclaimer, the term of this patent is extended or adjusted under 35 U.S.C. 154(b) by 753 days.

(21) Appl. No.: 13/412,653

(22) Filed: Mar. 6, 2012

(65) Prior Publication Data
US 2012/0229171 A1   Sep. 13, 2012

(30) Foreign Application Priority Data
Mar. 9, 2011 (TW) .............................. 100107986 A

(51) Int. Cl.
  *G06F 1/02* (2006.01)
  *G06F 1/03* (2006.01)
  *G06F 1/025* (2006.01)

(52) U.S. Cl.
  CPC  *G06F 1/025* (2013.01); *G06F 1/02* (2013.01); *G06F 1/022* (2013.01); *G06F 1/0328* (2013.01)

(58) Field of Classification Search
  CPC .................................... G06F 1/02; G06F 1/022
  USPC .................................................. 708/270, 271
  See application file for complete search history.

(56) References Cited

U.S. PATENT DOCUMENTS

| 5,014,231 A * | 5/1991 | Reinhardt et al. ............. 708/271 |
| 6,566,964 B1 * | 5/2003 | Hirano ........................... 331/1 A |
| 2011/0074469 A1 * | 3/2011 | Rapinoja et al. .............. 327/107 |

* cited by examiner

*Primary Examiner* — Chuong D Ngo
(74) *Attorney, Agent, or Firm* — Rabin & Berdo, P.C.

(57) ABSTRACT

One of the advantages of direct frequency synthesis technique (e.g., flying-adder architecture) is its capability of generating arbitrary frequency by utilizing the time-average-frequency concept. In the clock output of the direct frequency synthesizer, instead of one type of cycle, there are two types of cycles. Unlike the conventional one-type-cycle clock wherein clock energy is concentrated at its designed frequency, Time-Average-Frequency based clock spreads some of its energy into spurious tones, which could be harmful to certain applications. The spurious tones are caused by the periodic carry sequence generated from a fractional part accumulator inside the frequency synthesizer. The invention suggests a method and an apparatus to break this periodicity and convert the spurious tones into broadband noise.

14 Claims, 9 Drawing Sheets

05

10

FREQUENCY SYNTHESIZER AND FREQUENCY SYNTHESIZING METHOD FOR CONVERTING FREQUENCY'S SPURIOUS TONES INTO NOISE

This application claims the benefit of Taiwan application Serial No. 100107986, filed Mar. 9, 2011, the subject matter of which is incorporated herein by reference.

BACKGROUND OF THE INVENTION

1. Field of the Invention

The invention relates in general to a frequency synthesizer and a frequency synthesizing method, and more particularly to a frequency synthesizer and a frequency synthesizing method for converting spurious tones into noise.

2. Description of the Related Art

A frequency synthesizer provides a precise and stable frequency source within a frequency range, which is frequently seen in a modern electronic device, such as a radio receiver, a mobile telephone, a satellite receiver, a global positioning system or the like. The frequency synthesis technique includes the direct frequency synthesis, the indirect synthesis and the like. The direct frequency synthesis technique includes the direct digital pulse rate architecture, the flying-adder architecture, and the like, and has the advantages of the high frequency changing speed and the capability of generating the arbitrary frequency. However, it tends to generate spurs, and thus causes a frequency spectrum of an output signal of an analog-to-digital converter or a digital-to-analog converter, controlled by the frequency synthesizer, to contain a non-essential spurious tone.

The generation of the spur is substantially caused by a regular carry sequence of an accumulator in the frequency synthesizer.

Please refer to FIGS. 1A to 1C. FIG. 1A (Prior Art) is a schematic illustration showing an accumulator 05 of a conventional frequency synthesizer. FIG. 1B (Prior Art) a waveform graph showing an accumulated result of the accumulator of the conventional frequency synthesizer corresponding to FIG. 1A. FIG. 1C (Prior Art) shows signal frequency spectrums of carry sequences corresponding to the conventional frequency synthesizer of FIG. 1A and different fractional part values. In FIG. 1A, the conventional accumulator 05 adopts a control character FREQ, including an integer value I and a fractional part value r, to generate a carry sequence, wherein the fractional part value r is a constant. Because the fractional part value r is the constant, the accumulated result is stably increased and the carry sequence, generated by the conventional accumulator 05, has the regularity, as shown in FIG. 1B. After observing FIG. 1C, it is obtained that the spur, caused by the regular carry sequence, makes the frequency spectrum of the carry sequence contain non-essential spurious tones. In addition, the spurious tones caused by different fractional part value r are also different.

Please refer to FIGS. 1D and 1E. FIG. 1D (Prior Art) is a schematic illustration showing another example of an accumulator 10 of the conventional frequency synthesizer. FIG. 1E (Prior Art) is a waveform graph showing an accumulated result of the accumulator of the conventional frequency synthesizer corresponding to FIG. 1D. In FIG. 1D, the conventional accumulator 10 adopts the method of adding a random number v to the control character FREQ, including the integer value I and the fractional part value r, in order to break the regularity of the carry sequence, as shown in FIG. 1E, and thus to improve the generation of the spur and achieve the result of random dithering.

However, the method of adding the random number to the control character has many drawbacks. For example, the optimum size of the random number and the optimum adding rate cannot be easily determined, but the try and error method has to be adopted to repeat the operation to obtain the optimum value. In addition, in order to keep the output frequency unchanged, the overall average of the random numbers must be equal to 0. Thus, the circuit design has to use the signed number system, and the system complexity and cost are increased. Furthermore, in the high-speed operation mode, a high-speed adder needs to be used to add the random number, thereby wasting a lot of hardware resources.

SUMMARY OF THE INVENTION

The invention is directed to a frequency synthesizer and a frequency synthesizing method for converting spurious tones into noise and thus eliminating the negative effect of the overall system, caused by the spurious tones.

According to a first aspect of the present invention, a frequency synthesizer including an accumulating unit and a clock generator is provided. The accumulating unit includes a fractional part accumulator, a register unit and an integer accumulator. The fractional part accumulator performs an accumulation operation based on a fractional part value to output a carry sequence, which comprises a plurality of carry bits. The register unit writes the carry bits according to a first random address sequence, and reads the carry bits according to a second random address sequence whose order is different from that of the first random address sequence. The integer accumulator performs an accumulation operation based on an integer value and the read carry bits to continuously output a count value. The clock generator outputs a clock signal according to the count value.

According to a second aspect of the present invention, a frequency synthesizing method including the following steps is provided. An accumulation operation is performed based on a fractional part value to output a carry sequence, which comprises a plurality of carry bits. The carry bits are written to a register unit according to a first random address sequence, and the carry bits are read from the register unit according to a second random address sequence whose order is different from that of the first random address sequence. An accumulation operation is performed based on an integer value and the read carry bits to continuously output a count value. A clock signal is outputted according to the count value.

The above and other aspects of the invention will become better understandable with regard to the following detailed description of the preferred but non-limiting embodiment(s). The following description is made with reference to the accompanying drawings.

DETAILED DESCRIPTION OF THE INVENTION

The invention proposes a frequency synthesizer and a frequency synthesizing method for converting spurious tones into noise by randomizing a carry sequence so that the negative effect of the overall system, caused by the spurious tones, can be reduced or eliminated.

Figure 1A:
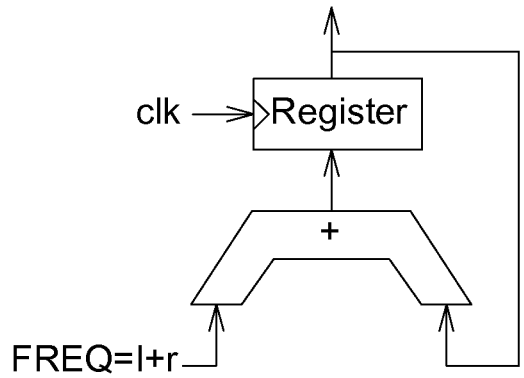
FIG. 1A (Prior Art) is a schematic illustration showing an accumulator of a conventional frequency synthesizer.
Figure 1B:
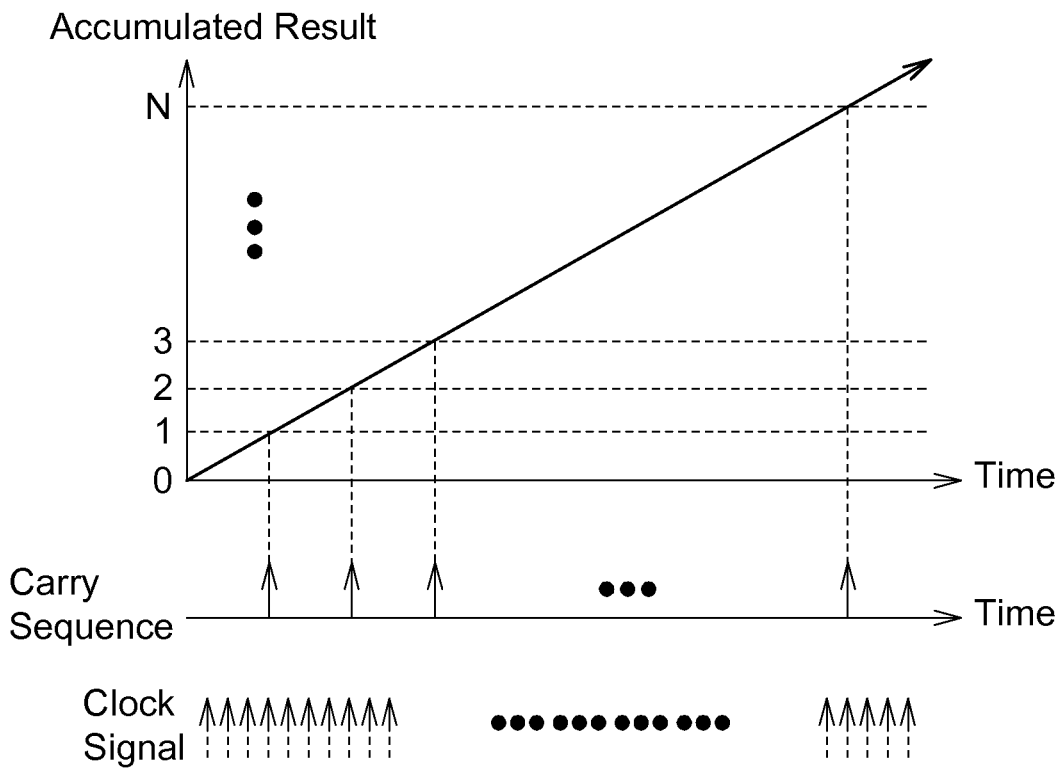
FIG. 1B (Prior Art) a waveform graph showing an accumulated result of the accumulator of the conventional frequency synthesizer corresponding to FIG. 1A.
Figure 1C:
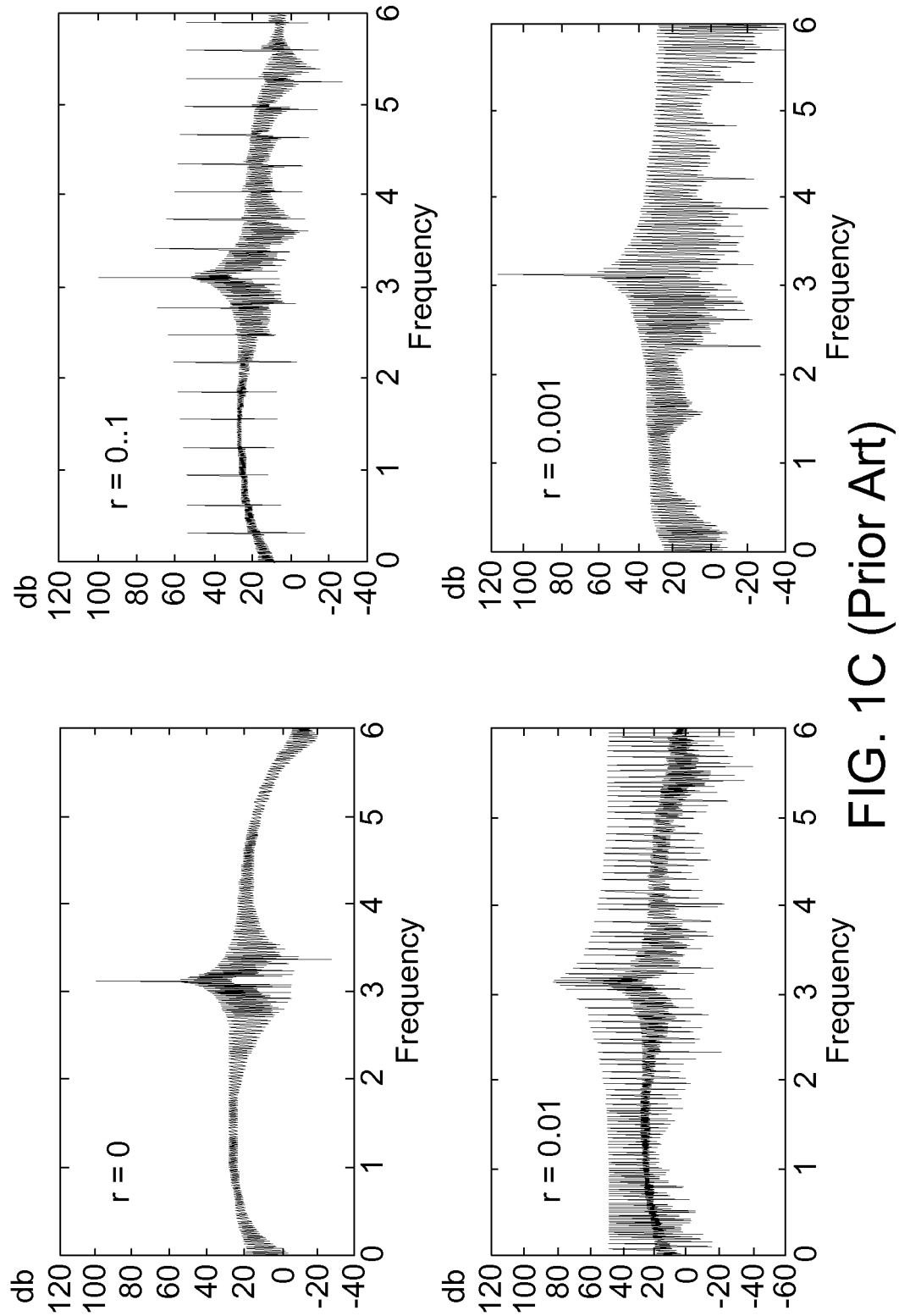
FIG. 1C (Prior Art) shows signal frequency spectrums of carry sequences corresponding to the conventional frequency synthesizer of FIG. 1A and different fractional part values.
Figure 1D:
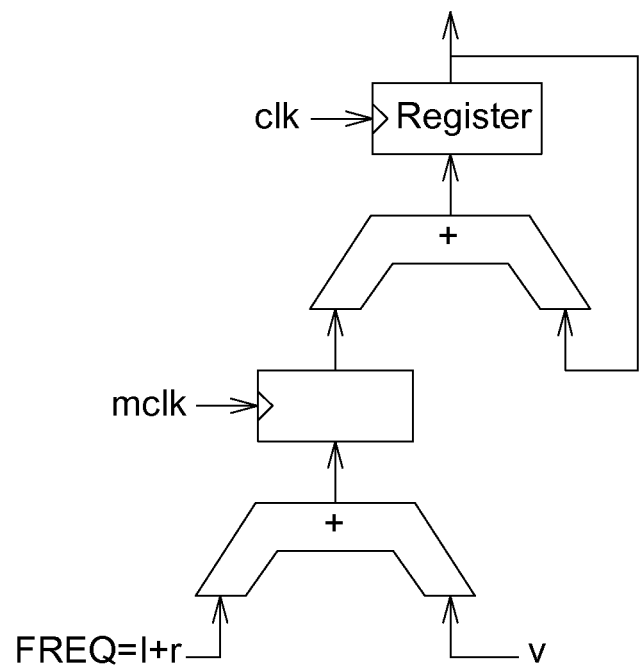
FIG. 1D (Prior Art) is a schematic illustration showing another example of an accumulator of the conventional frequency synthesizer.
Figure 1E:
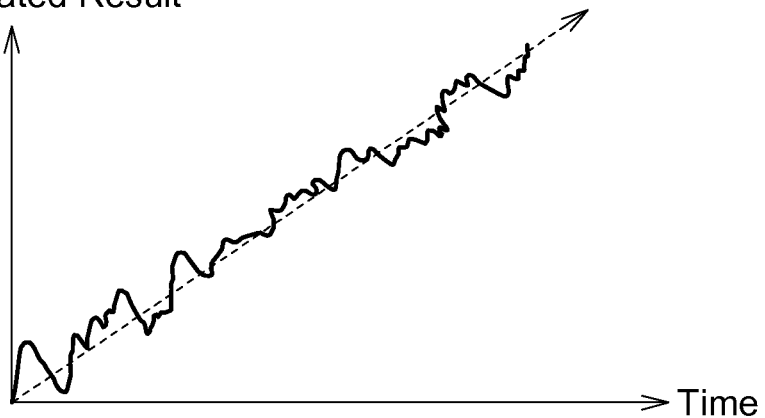
FIG. 1E (Prior Art) is a waveform graph showing an accumulated result of the accumulator of the conventional frequency synthesizer corresponding to FIG. 1D.
Figure 2A:
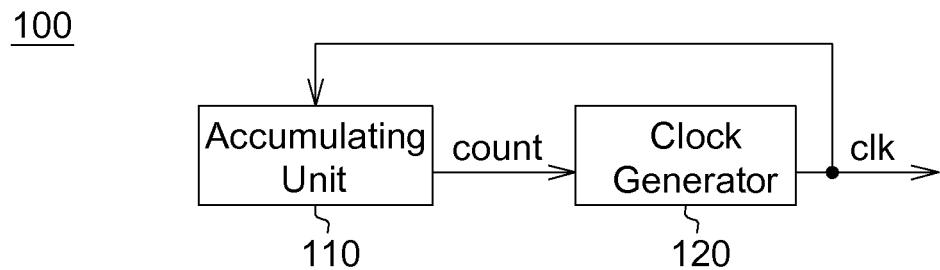
FIG. 2A is a block diagram showing a frequency synthesizer according to a preferred embodiment of the invention.
Figure 2B:
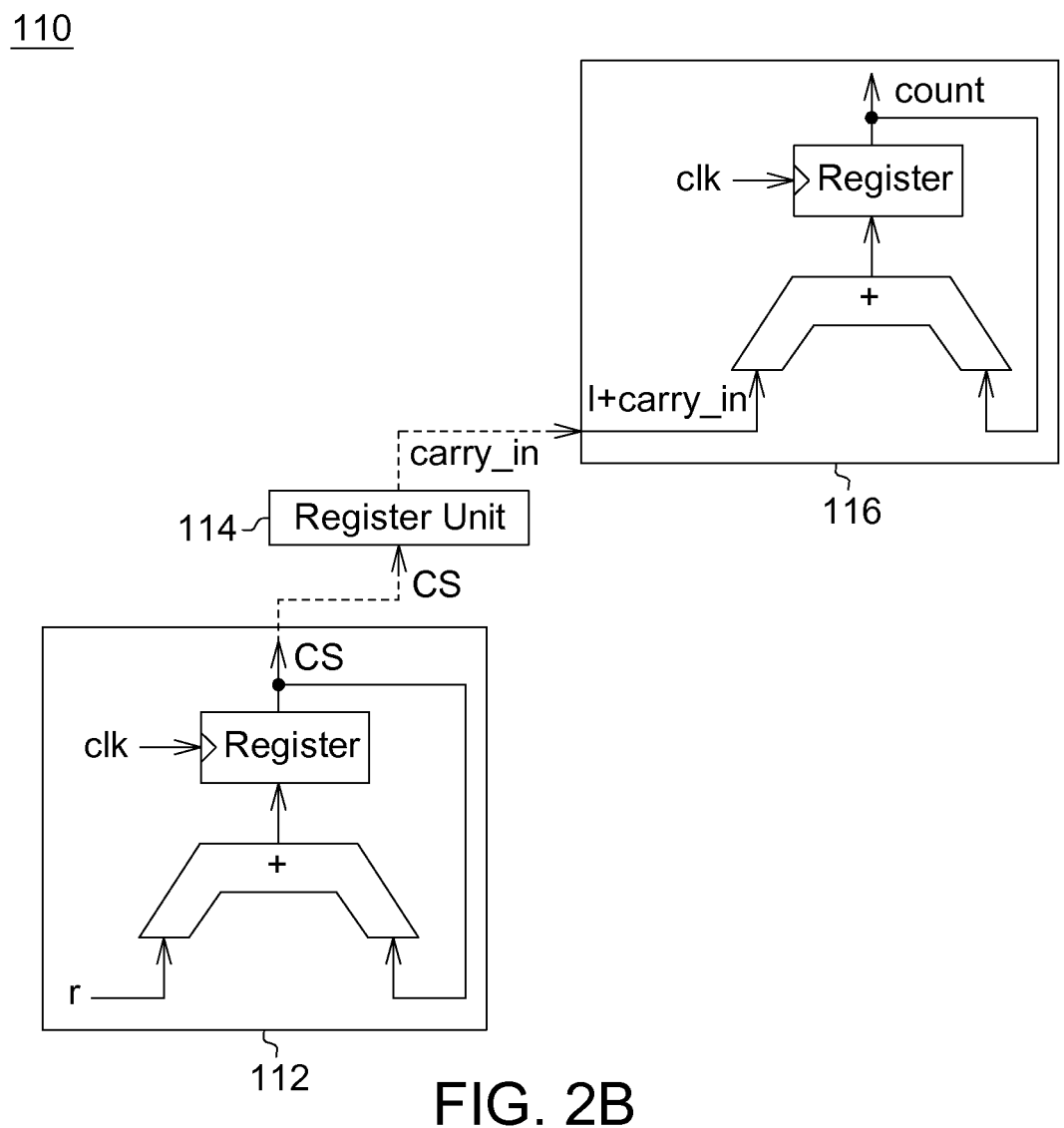
FIG. 2B is a schematic illustration showing an accumulating unit of the frequency synthesizer according to the preferred embodiment of the invention.

FIG. 2A is a block diagram showing a frequency synthesizer 100 according to a preferred embodiment of the invention. FIG. 2B is a schematic illustration showing an accumulating unit of the frequency synthesizer 100 according to the preferred embodiment of the invention. Referring to FIGS. 2A and 2B, the frequency synthesizer 100 includes an accumulating unit 110 and a clock generator 120. The accumulating unit 110 includes a fractional part accumulator 112, a register unit 114 and an integer accumulator 116. The fractional part accumulator 112 performs an accumulation operation based on a fractional part value r to output a carry sequence CS, which is a 1-bit data stream and sequentially includes a number of carry bits. At this time, the carry sequence CS still has the regularity based on the fractional part value r.

The register unit 114 writes the carry bits according to a first random address sequence, and reads the carry bits as the read carry bits carry_in according to a second random address sequence whose arrangement is irrelevant to that of the first random address sequence. Because no correlation is presented between the first random address sequence and the second random address sequence, discord exists between the order of writing the carry bits to the register unit 114 and the order of reading the carry bits from the register unit 114. That is, the orders of writing and reading the carry bits are different from each other and some randomness is produced in the process, such that the regularity of the carry sequence CS is broken. The integer accumulator 116 performs an accumulation operation based on an integer value I and the read carry bits carry_in to continuously output a count value "count". The clock generator 120 outputs a clock signal clk according to the count value "count".

Figure 3:
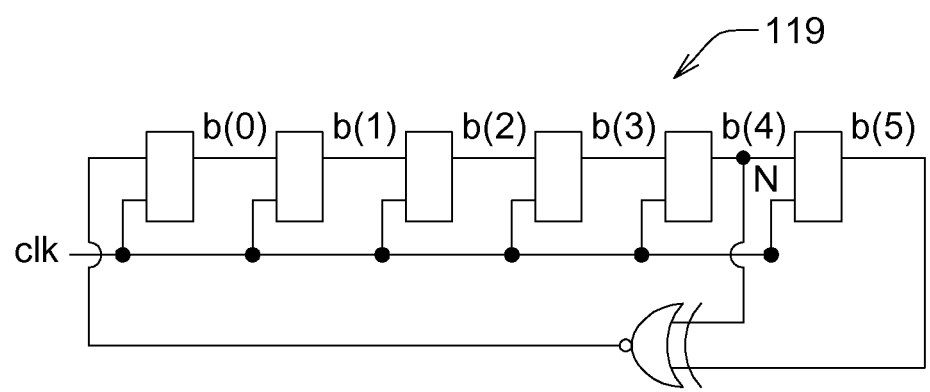
FIG. 3 is a schematic illustration showing an example of an address generating circuit according to the preferred embodiment of the invention.

The first random address sequence and the second random address sequence without correlation can be recorded in a look-up table (not shown in the drawing) so that they can be used when the register unit 114 is accessing. In addition, an address generating circuit 118 for providing the first random address sequence and the second random address sequence to the register unit 114 may also be additionally provided in the accumulating unit 110. The method of implementing the address generating circuit 118 is not particularly restricted in this invention, and may utilize a linear feedback shift register (LFSR) 119 with 6 address bits (b[0] to b[5]), for example, to generate the first random address sequence, as shown in FIG. 3, and then to generate the second random address sequence by way of bitwise inversion. In addition, if the connection position of the connection point N is changed from b[4] to another address bit, another random address sequence whose order is different from that of the first random address sequence and the second random address sequence may also be generated.

In FIG. 2B, when the accumulation operation of the fractional part value r does not overflow, the corresponding carry bit is 0; and when the accumulation operation of the fractional part value r overflows, the corresponding carry bit is 1. In addition, the size of the register unit 114 is equal to, for example, (2P−1) bits, where P is a positive integer greater than 1. Because the conventional memory size is usually chosen to be 2P bits, the size of the register unit 114 may be selected to be (2P−1) bits. Consequently, the size of the register unit 114 will not be easily a multiple of the regularly repeated bit number of the carry sequence CS, and this is further advantageous to the object of randomizing the carry sequence.

An example, in which the fractional part value r is equal to 0.2, and the size of the register unit 114 is equal to 63 bits (P is equal to 6), will be described. According to the above-mentioned assumptions, the carry bits $b1, b2, \ldots bm, \ldots$ contained in the carry sequence CS are sequentially 0, 0, 0, 0, 1, 0, 0, 0, 0, 1, ..., 0, 0, 0, 0, 1, ..., repeating. First, the register unit 114 writes the carry bits b1 to b63, which include twelve "1"'s and fifty-one "0"'s, according to the first random address sequence in a first period T1 (which contains 63 clock cycles). Next, the register unit 114 reads the carry bits b1 to b63, stored in the register unit 114, according to the second random address sequence in a second period T2 (which contains 63 clock cycles). Because twelve "1"'s and fifty-one "0"'s are randomly written according to the first random address sequence, the distribution in the register unit 114 does not have the original regularity. Thereafter, they are read according to the second random address sequence. Thus, the arrangement rule of the read carry bits, as compared with the originally arranged carry bits b1, b2, ..., b62, b63, further has the relative randomness.

Meanwhile, to save clock cycle, during the second period T2 of reading the first carry group of $b_1$ to $b_{63}$, the next carry group of $b_{64}$ to $b_{126}$ can be written to the register unit 114 at the same time. The operation can be carried out in this fashion continually.

As mentioned hereinabove, it is obtained that the first random address sequence and second random address sequence whose orders are different from are sufficient to make the original carry sequence CS generate the relative randomness and break the regularity. However, if the randomness is to be further enhanced, the register unit can read the carry bits b64 to b126, stored in the register unit 114, according to a third random address sequence in the third period T3 (which contains 63 clock cycles), and simultaneously write the late read carry bits b127, b128, ..., b188, b189 according to the third random address sequence whose order is different from that of the first random address sequence and the second random address sequence. That is, every 63 carry bits adopt different random address sequences, and the regularity of the carry sequence CS is thoroughly broken. Consequently, the count value "count" outputted from the integer accumulator 116 also has no regularity, so the generation of spur can be effectively reduced.

Figure 4A:
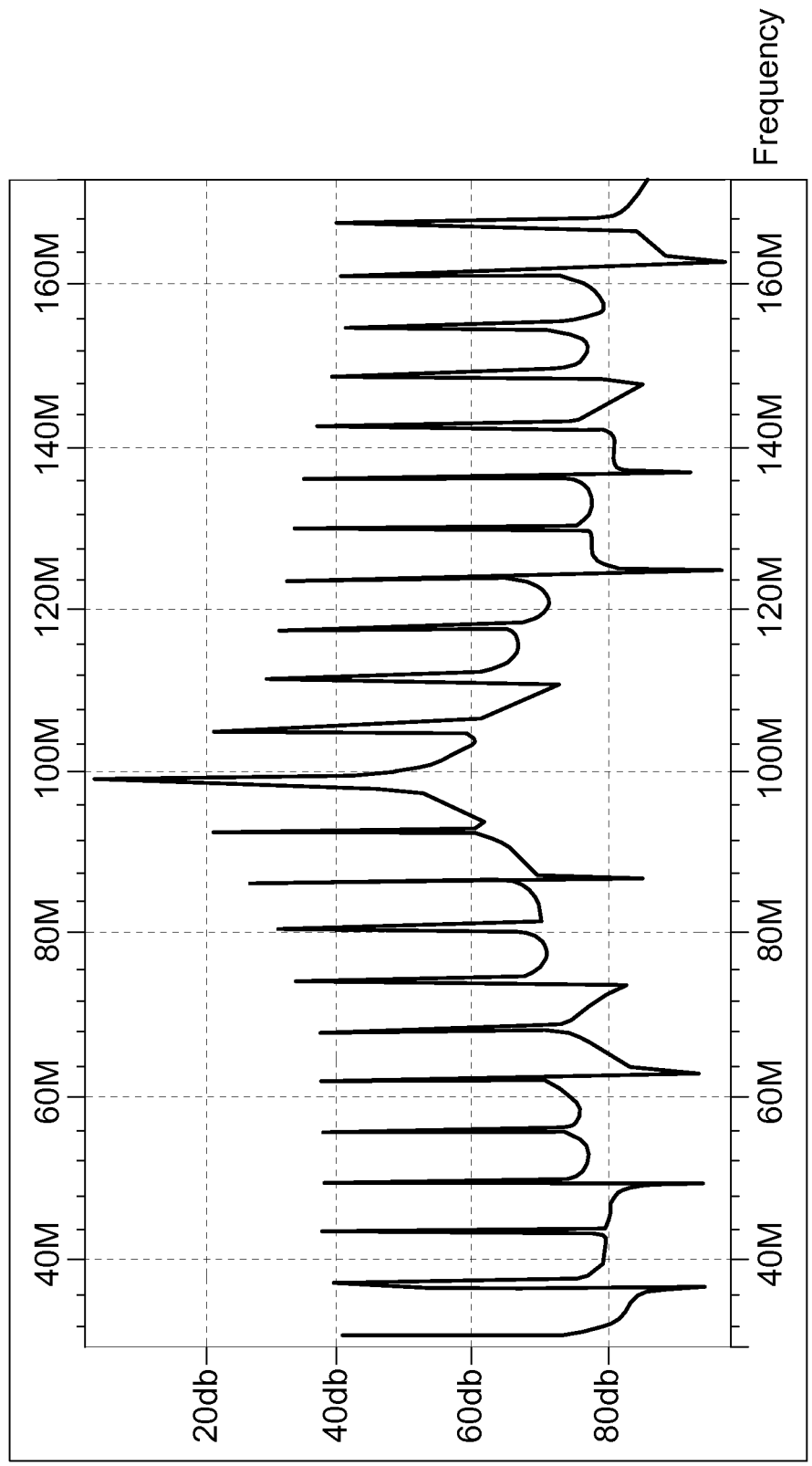
FIG. 4A (Prior Art) shows a signal frequency spectrum of a conventional clock signal.
Figure 4B:
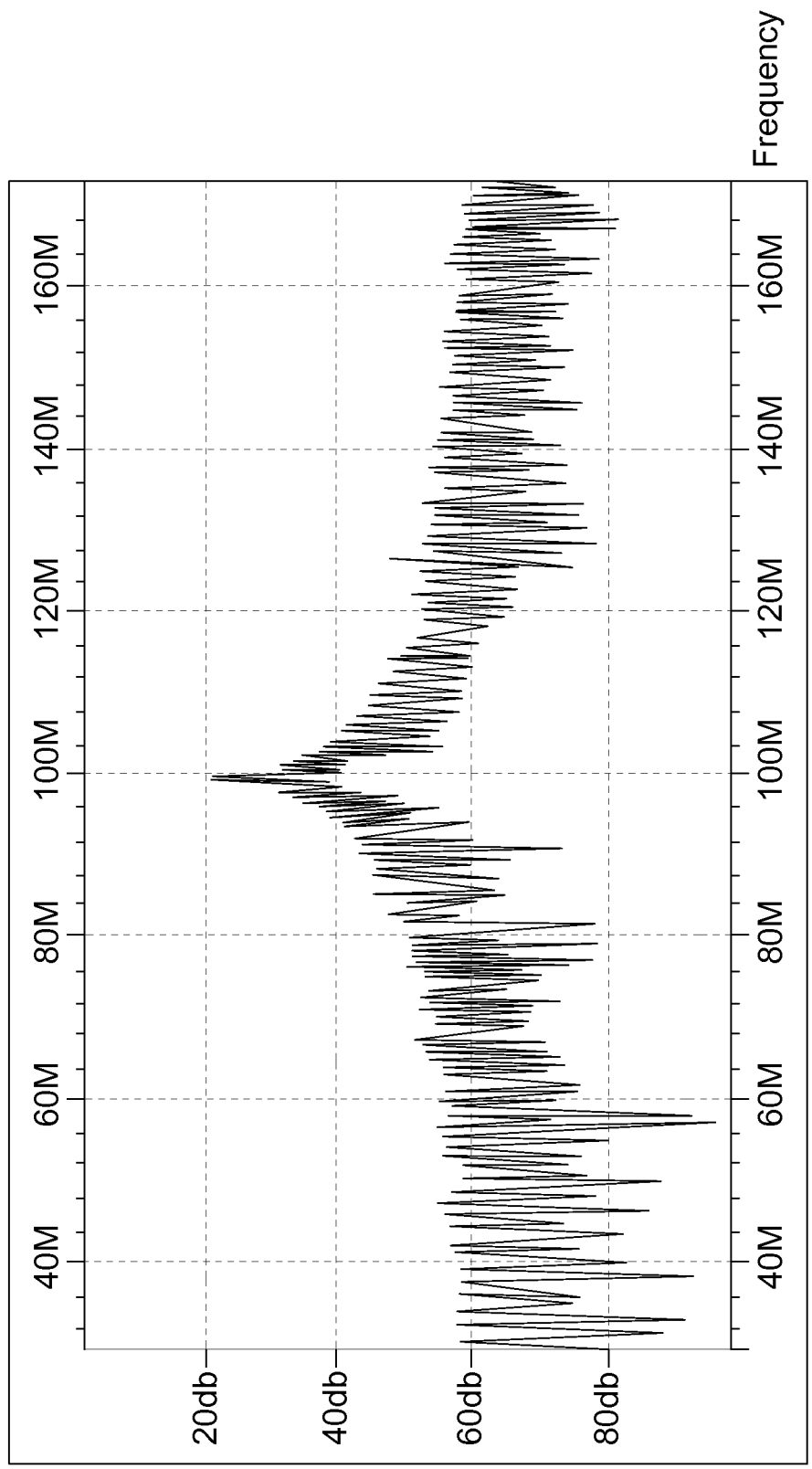
FIG. 4B shows a signal frequency spectrum of a clock signal according to the preferred embodiment of the invention.

FIG. 4A (Prior Art) shows a signal frequency spectrum of a conventional clock signal. FIG. 4B shows a signal frequency spectrum of a clock signal according to the preferred embodiment of the invention. It is obtained, after comparing FIG. 4A with 4B, that the spurious tones are effectively converted into noise after the frequency synthesizer of the invention randomizes the carry sequence. So, the negative effect of the overall system caused by the spurious tones can be reduced or eliminated. Thus, the frequency synthesizer 100 of the invention is more suitable for the controlling of an electronic device, such as an analog-to-digital converter or a digital-to-analog converter.

Figure 5A:
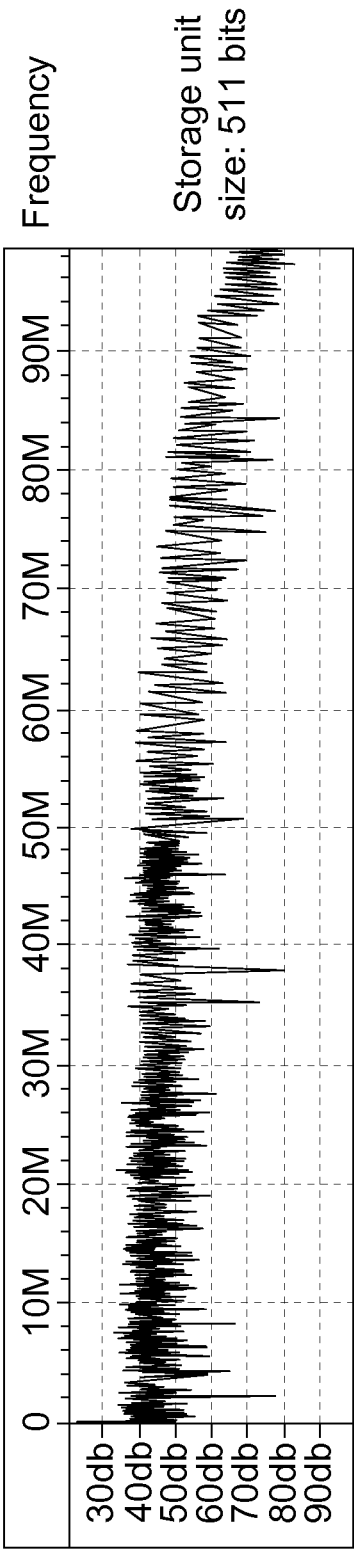
FIG. 5A shows a signal frequency spectrum of a carry sequence of a storage unit with the size of 511 bits according to the preferred embodiment of the invention.
Figure 5B:
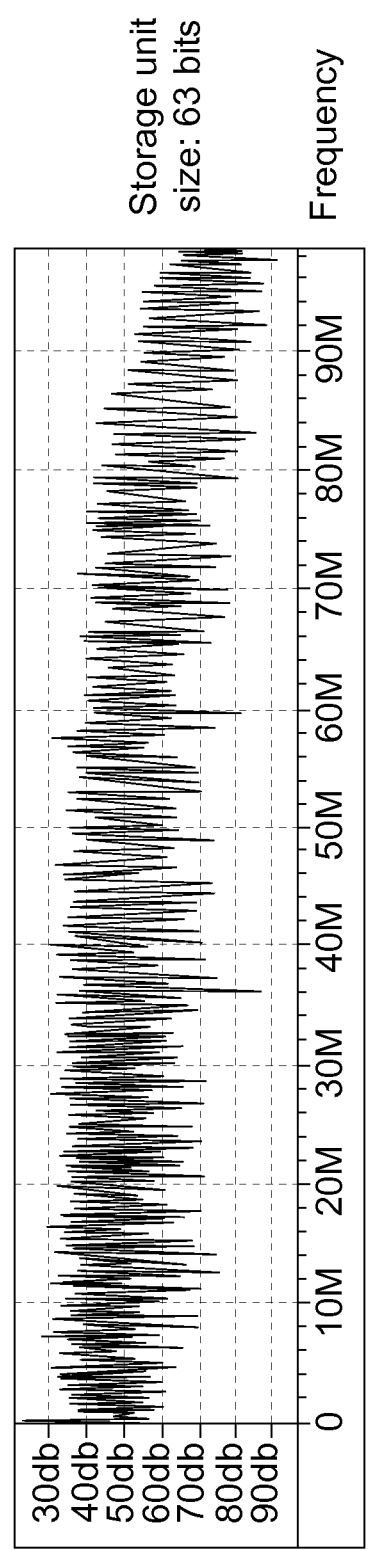
FIG. 5B shows a signal frequency spectrum of a carry sequence of a storage unit with the size of 63 bits according to the preferred embodiment of the invention.

FIG. 5A shows a signal frequency spectrum of a carry sequence of a storage unit with the size of 511 bits according to the preferred embodiment of the invention. FIG. 5B shows a signal frequency spectrum of a carry sequence of a storage unit with the size of 63 bits according to the preferred embodiment of the invention. It is obtained, after comparing FIG. 5A with FIG. 5B, that the frequency synthesizer of the invention can effectively convert the spurious tones into noise without a large memory, so that the hardware resource is wasted and low cost can be maintained.

Figure 6:
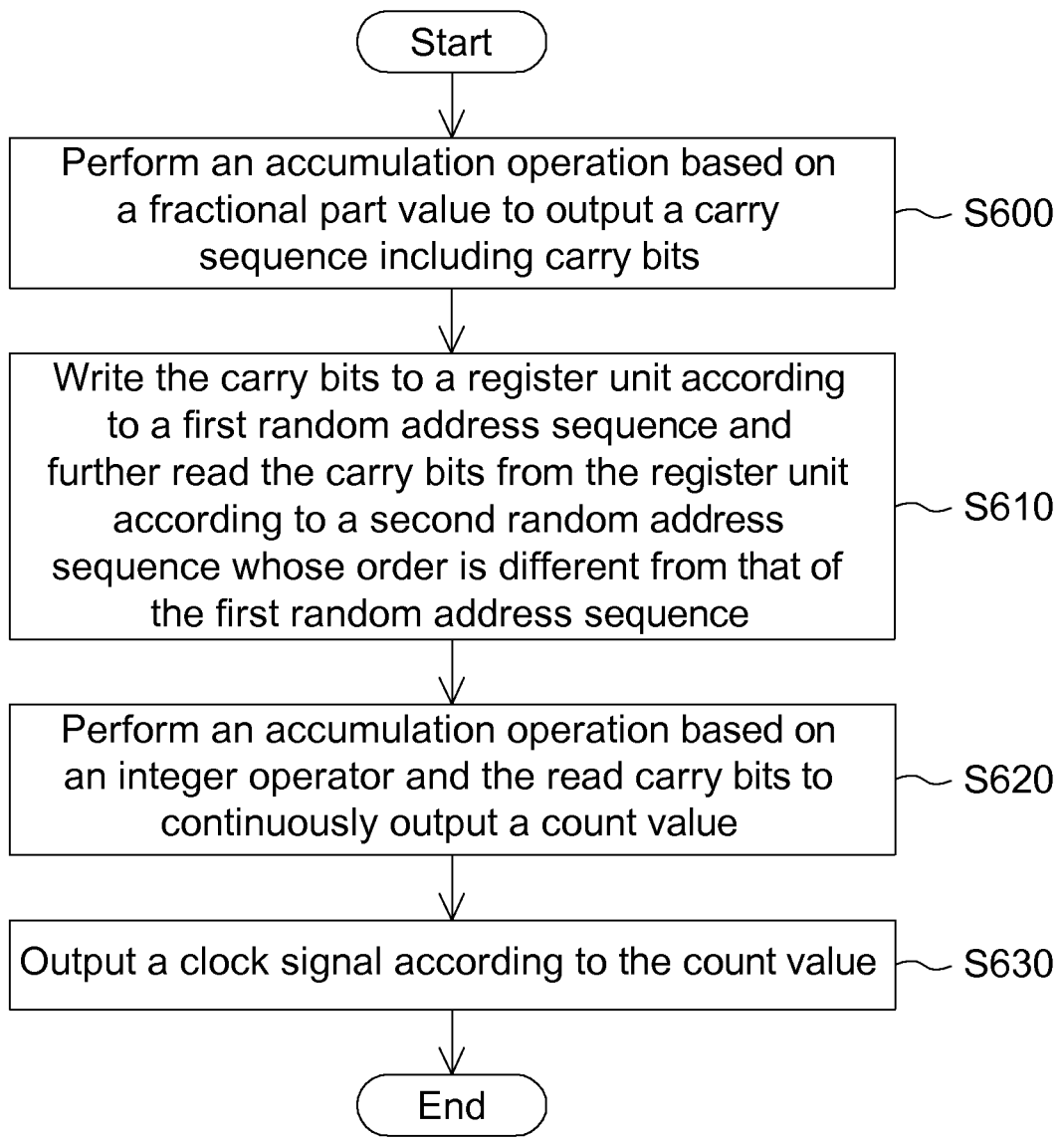
FIG. 6 is a flow chart showing a frequency synthesizing method according to the preferred embodiment of the invention.

The invention further proposes a frequency synthesizing method. FIG. 6 is a flow chart showing a frequency synthesizing method according to the preferred embodiment of the invention. In step S600, an accumulation operation is performed based on a fractional part value to output a carry sequence including multiple carry bits. In step S610, the carry bits are written into a register unit according to a first random address sequence, and the carry bits are further read from the register unit according to a second random address sequence whose order is different from that of the first random address sequence. In step S620, an accumulation operation is performed based on an integer value and the read carry bits to continuously output a count value. In step S630, a clock signal is outputted according to the count value.

The principle of the frequency synthesizing method has been described in FIGS. 2A to 5B and the associated contents thereof, so detailed descriptions thereof will be omitted.

The frequency synthesizer and the frequency synthesizing method according to the embodiment of the invention have many advantages, some of which will be described in the following.

In the frequency synthesizer and the frequency synthesizing method of the invention, different random address sequences are utilized so that the carry sequence can be randomized, the spurious tones can be effectively converted into noise through the randomized carry sequence, so that the negative effect of the overall system, caused by the spurious tones, can be reduced or eliminated. Because the frequency synthesizer of the invention needs not to adopt a large memory, the hardware resource is not wasted and the cost can be kept low. In addition, no additional high-speed adder has to be provided to add the random number. So, the invention is advantageous to the high-speed operation.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A frequency synthesizer, comprising:
   an accumulating unit, comprising:
   a fractional part accumulator for performing an accumulation operation based on a fractional part value to output a carry sequence, which comprises a plurality of carry bits;
   a register unit for writing the carry bits according to a first random address sequence, and reading the carry bits according to a second random address sequence whose order is different from that of the first random address sequence; and
   an integer accumulator for performing an accumulation operation based on an integer value and the read carry bits to continuously output a count value; and
   a clock generator for outputting a clock signal according to the count value.

2. The frequency synthesizer according to claim 1, wherein the first random address sequence and the second random address sequence are recorded in a look-up table.

3. The frequency synthesizer according to claim 1, wherein the accumulating unit further comprises an address generating circuit, which utilizes a linear feedback shift register to generate the first random address sequence and the second random address sequence.

4. The frequency synthesizer according to claim 1, wherein the corresponding carry bit is 0 when the accumulation operation of the fractional part value does not overflow, and the corresponding carry bit is 1 when the accumulation operation of the fractional part value overflows.

5. The frequency synthesizer according to claim 1, wherein a size of the register unit is equal to (2P−1) bits, where P is a positive integer greater than 1.

6. The frequency synthesizer according to claim 5, wherein when the carry bits are b1, b2, . . . , bm, . . . , the register unit writes the carry bits b1, b2, . . . , b(P−1) in a first period according to the first random address sequence, the register unit reads the carry bits b1, b2, . . . , b(P−1) in a second period according to the second random address sequence, and simultaneously writes the carry bits bP, b(P+1), . . . , b2(P−1) according to the second random address sequence, and the register unit reads the carry bits bP, b(P+1), . . . , b2(P−1) in a third period according to the first random address sequence.

7. The frequency synthesizer according to claim 5, wherein when the carry bits are b1, b2, . . . , bm, . . . , the register unit writes the carry bits b1, b2, . . . , b(P−1) in a first period according to the first random address sequence, the register unit reads the carry bits b1, b2, . . . , b(P−1) in a second period according to the second random address sequence and simultaneously writes the carry bits bP, b(P+1), . . . , b2(P−1) according to the second random address sequence, and the register unit reads the carry bits bP, b(P+1), . . . , b2(P−1) in a third period according to a third random address sequence whose order is different from that of the first random address sequence and the second random address sequence.

8. A frequency synthesizing method, comprising the steps of:
   performing an accumulation operation based on a fractional part value to output a carry sequence, which comprises a plurality of carry bits;
   writing the carry bits to a register unit according to a first random address sequence, and reading the carry bits from the register unit according to a second random address sequence whose order is different from that of the first random address sequence;

performing an accumulation operation based on an integer value and the read carry bits to continuously output a count value; and outputting a clock signal according to the count value.

9. The method according to claim 8, wherein the first random address sequence and the second random address sequence are recorded in a look-up table.

10. The method according to claim 8, further comprising the step of:

utilizing a linear feedback shift register to generate the first random address sequence and the second random address sequence.

11. The method according to claim 8, wherein the corresponding carry bit is 0 when the accumulation operation of the fractional part value does not overflow, and the corresponding carry bit is 1 when the accumulation operation of the fractional part value overflows.

12. The method according to claim 8, wherein a size of the register unit is equal to (2P−1) bits, where P is a positive integer greater than 1.

13. The method according to claim 12, further comprising, when the carry bits are $b_1, b_2, \ldots, b_m, \ldots$, the steps of:

writing the carry bits $b_1, b_2, \ldots, b(P-1)$ to the register unit in a first period according to the first random address sequence;

reading the carry bits $b_1, b_2, \ldots, b(P-1)$ from the register unit in a second period according to the second random address sequence and simultaneously writing the carry bits $bP, b(P+1), \ldots, b2(P-1)$ to the register unit according to the second random address sequence; and reading the carry bits $bP, b(P+1), \ldots, b2(P-1)$ from the register unit in a third period according to the first random address sequence.

14. The method according to claim 12, further comprising, when the carry bits are $b_1, b_2, \ldots, b_m, \ldots$, the steps of:

writing the carry bits $b_1, b_2, \ldots, b(P-1)$ to the register unit in a first period according to the first random address sequence;

reading the carry bits $b_1, b_2, \ldots, b(P-1)$ from the register unit in a second period according to the second random address sequence and simultaneously writing the carry bits $bP, b(P+1), \ldots, b2(P-1)$ to the register unit according to the second random address sequence; and reading the carry bits $bP, b(P+1), \ldots, b2(P-1)$ from the register unit in a third period according to a third random address sequence whose order is different from that of the first random address sequence and the second random address sequence.

\* \* \* \* \*